Figure 6:
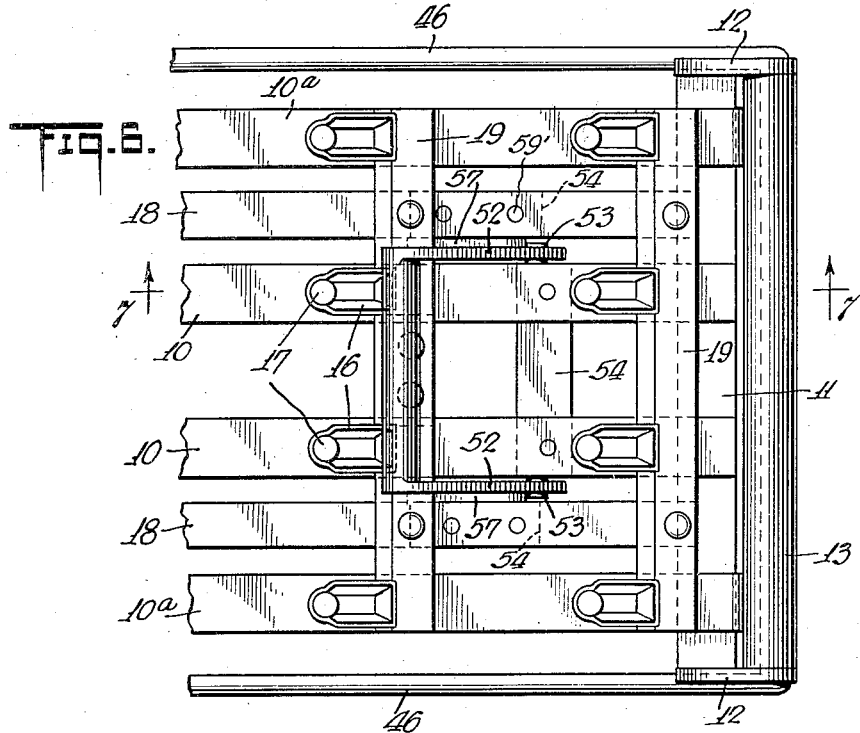

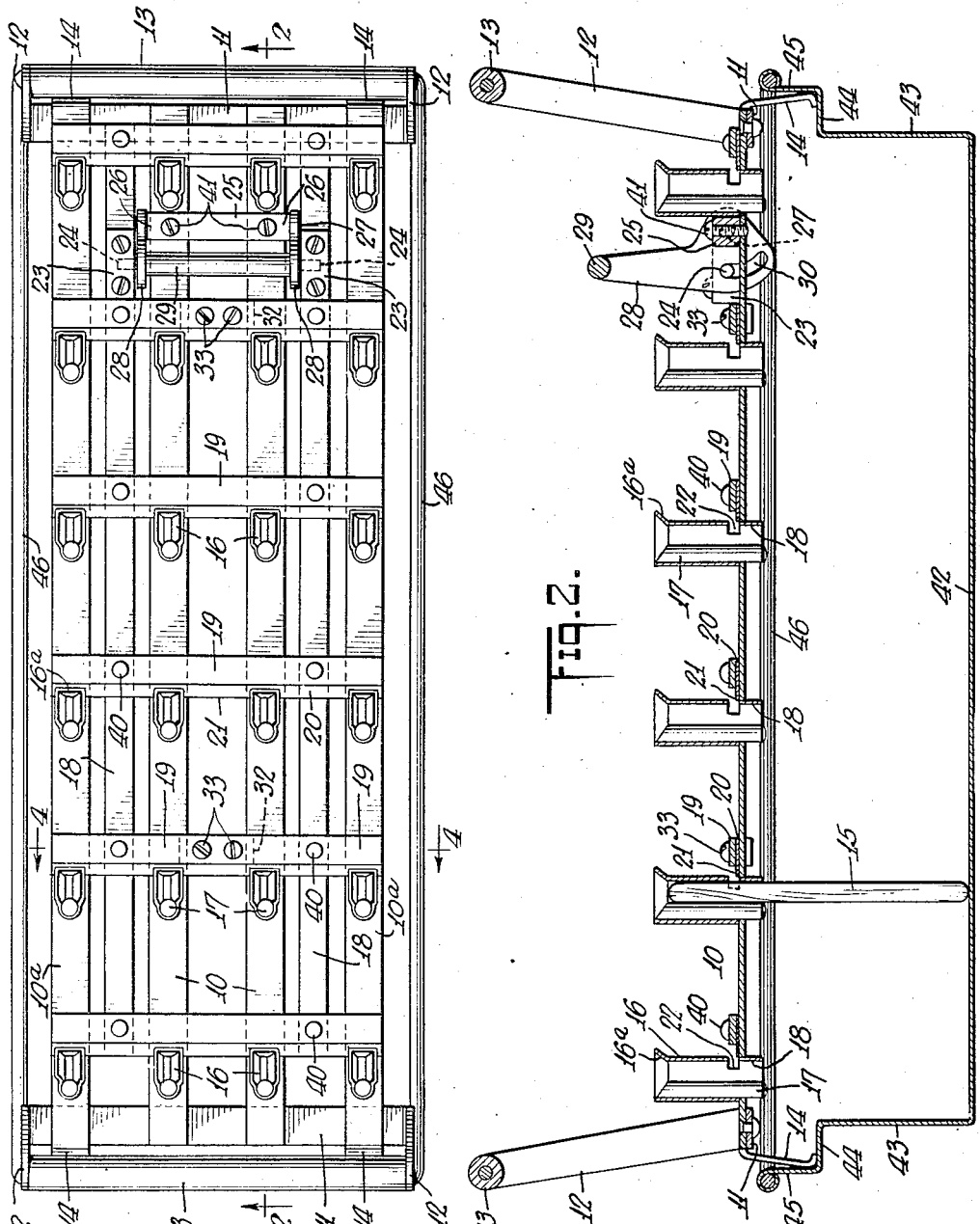

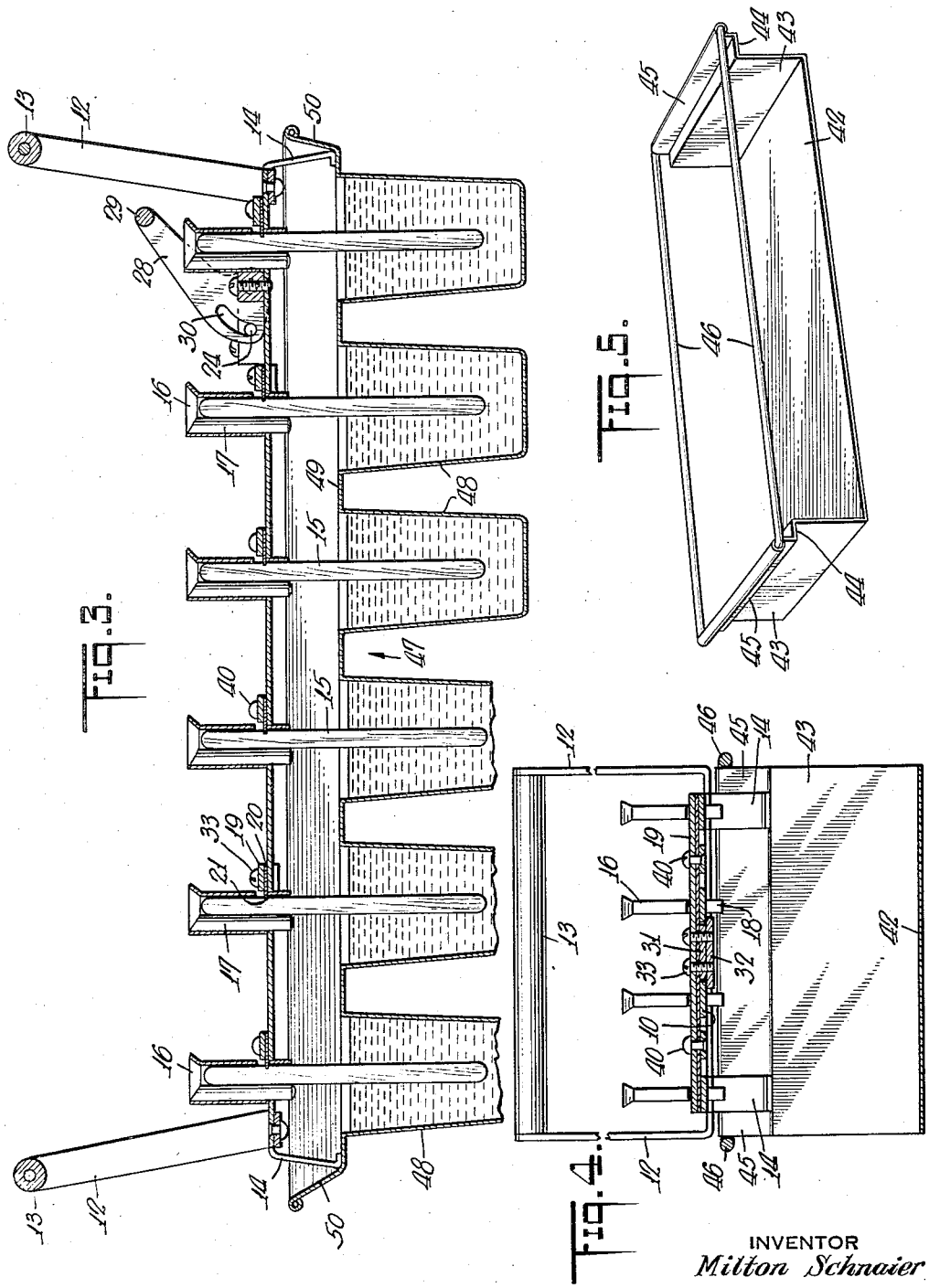

Patented July 10, 1934

1,966,048

UNITED STATES PATENT OFFICE 1,966,048

STICK HANDLING MECHANISM

Milton Schnaier, New York, N. Y.

Application January 3, 1931, Serial No. 506,373
Renewed November 22, 1933

9 Claims. (Cl. 107—8)

My present invention while developed primarily as an instrumentality to expedite the manufacture of handled frozen confections of the general type shown in the prior patent to Frank W. Epperson, No. 1,505,592 August 19, 1924, is in its broader aspects of more general application.

An object of the invention is to facilitate the manufacture of handled frozen confections of the above type by reducing the labor cost and expediting the speed of production, to render the product more attractive and more uniform by assuring the accurate centering of the sticks or other handle members and maintaining the latter from tilting or buoying displacement, and to render the production more sanitary by eliminating the likelihood of the operatives handling the confections.

Another object is to provide apparatus for accomplishing the above objects, which apparatus shall be of relatively inexpensive, simple, practical, rugged, and durable yet light and portable construction, capable of convenient operation with little effort by unskilled operatives, unlikely to jam or otherwise get out of order, substantially devoid of mechanism requiring lubrication, and capable of convenient cleaning to maintain the high sanitary standard desired.

Another more specific object is to facilitate the removal of the frozen confections from their molds without the waste and breakage incurred in dumping the same and without the likelihood of stick or confection breakage incurred in individually pulling them from the molds.

A feature of the invention is the use of a handle retainer for disposing of the various sticks or other handles for the contents of one multi-compartment mold in fixed correctly co-ordinated relation with respect to the mold cavities.

Preferably the handle retainer is of contour such as to fit accurately in the top of a multi-compartment mold with the sticks projecting downward into the mold cavities and gripped and correctly centered by the retainer with respect to the individual confections to be frozen, so that upon completion of the freezing the retainer may be lifted from the mold, with the confections bonded to the lower ends of the sticks, and the sticks with the confections bonded thereto may thereupon be released from the retainer.

A feature of the stick retainer is the use of a metallic holder frame presenting guides for the various sticks or handles and an auxiliary gripper structure associated therewith and coordinated for displacement relative thereto, to cause releasable gripping of the sticks or handles at the guides therefor.

Another feature is the specific application of the invention in connection with flat sticks preferably used in the confections referred to, and more particularly in the engagement of the gripping edges with the thickness rather than with the width of the flat sticks.

Another feature is the arrangement of upstanding sockets or funnels into which the sticks may be conveniently delivered by an automatic stick feeder, in itself not a part of this invention, and the transverse slotting of such funnels at the level of the gripper structure to permit entry of the stick gripping edge.

Another feature is the track guiding arrangement of the gripper structure, on the holder frame, the former presenting pushing edges forcing each of the sticks against the wall of the holder cavity.

Another feature is the shifting means for moving the gripping structure along the holder frame, and embodying a single cam, or toggle transmission, effective to lock the gripping edges in operative relation.

The depth to which the sticks enter the mold cavities according to another feature is pre-gauged in suitable manner.

For setting the sticks in position the handle retainer is mounted on a depth gauging frame and positioned in the retainers and permitted to gravitate until the bottoms thereof strike the gauge surface, whereupon the gripper member is locked.

Figure 7:
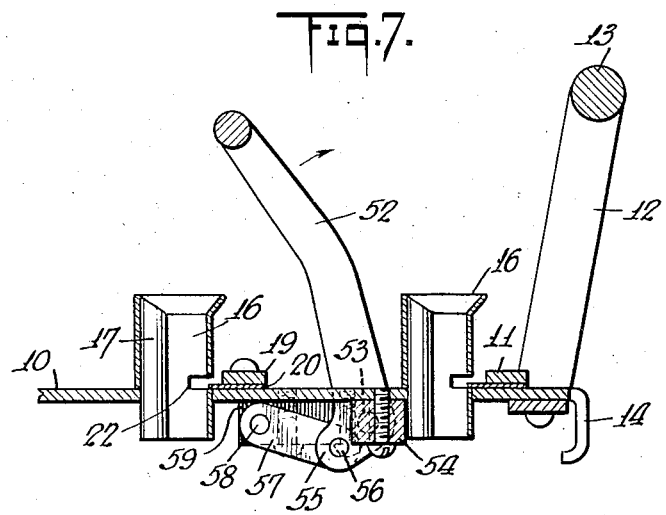

Although the novel features which are believed to be characteristics of this invention will be particularly pointed out in the appended claims, the invention itself, as to its objects and advantages, the mode of its operation and the manner of its organization may be better understood by referring to the following description taken in connection with the accompanying drawings forming a part thereof, in which Fig. 1 is a top plan view of the arrangement embodying the present invention, Fig. 2 is a section taken on line 2—2, of Fig. 1 and showing the gripping member of the device in released position with respect to the sticks, Fig. 3 is a section similar to Fig. 2, but showing the gripping elements in engaging position with respect to the sticks, and the device mounted in cooperative relationship with a multiple mold assembly, Fig. 4 is a section taken on line 4—4 of Fig. 1, Fig. 5 is a perspective showing the depth gauging frame, Fig. 6 is a fragmentary plan view of an alternative embodiment and, Fig. 7 is a transverse sectional view on line 7—7 of Fig. 6.

In the following description and in the claims parts will be identified by specific names for convenience, but they are intended to be as generic in their application to similar parts as the art will permit.

In accordance with a specific embodiment of the present invention, there is provided a main or holder frame structure which preferably takes the form of two pairs of longitudinally extending bars 10 and 10a disposed in parallel spaced relationship and interconnected by means of a pair of transversely extending bars 11 at the opposite ends thereof. The holder frame is preferably provided with handles to facilitate carrying the same, and for that purpose, the ends of the bars 11 are turned upward to form arms 12, each pair of which is connected by a handle rod 13. The holder frame structure may also be provided with suitable standards, which in the specific construction shown, is formed by feet 14 turned down from the ends of the bars 10a.

For receiving the sticks which constitute the handle members the holder frame is preferably provided with upstanding tubular guide or funnel members 16, illustratively shown six in number equally spaced along the length of each of the bars 10 and 10a. The tubes are preferably of sheet metal, preferably flared at their upper edges at 16a for facility of insertion of the sticks when delivered from an automatic stick feeder (not shown).

For use with the flat sticks 15, preferably employed as handle members for the frozen confections, the funnel or guide members are correspondingly flattened as shown and the flat faces thereof are preferably aligned longitudinally of the various bars 10 and 10a. The guide member preferably includes a pilot portion 18 extending through a corresponding aperture in the holder bar 10 or 10a and has associated therewith a stiffening pin or rod 17, extending within the guide between and in contact with the two faces thereof and along one of the narrow edges and protruding through the lower end of the latter. The pin or rod 17 is soldered, brazed or welded to form a unit with the tube, and the lower end of the rod and the pilot end of the tube are similarly attached to the holder bar 10 or 10a.

The sticks 15 are inserted in the guide tubes 16 and locked therein by means of gripping members operating collectively. These members are mounted upon a slidable frame carried by the holder frame structure, and which, in the specific form shown, includes a pair of longitudinally extending bars 18 between each frame 10 and the adjacent frame bar 10a and interconnected together by means of transversely extending bars 19 riveted thereto at 40. Each of the transverse bars 19 is disposed adjacent a transverse row of guide tubes 16. Clamped between each of the transverse bars 19 and the longitudinal bars 18 is a gripping plate, bar or blade 20 having the transversely extending edge thereof projecting beyond the transversely extending edge of the corresponding bar 19 to provide a relatively sharp gripping edge 21.

The longitudinal movement of the slidable frame structure along the main frame structure serves to advance the gripping plates 20 into or out of cooperative relationship with the guide tubes 16. These guide tubes have openings 22 preferably in a narrow side thereof and at the level of gripping edge 21 thereby to permit the gripping edges 21 of the plates 20 to engage contiguous narrow edges of the sticks 15 disposed therein.

The slidable gripper structure is guided in its longitudinal movement more fully described hereinafter, by a cleat arrangement which includes two pairs of oppositively disposed bars 31 and 32 connected by screws 33 to the underside of two of the transversely extending bars 19. The bars 31 are disposed in the same plane with the bars 10 and the bars 32 have the ends thereof extending beyond the ends of said bars 31 to engage the marginal portions of the longitudinal bars 10, affording a limited track guided movement of the gripper structure along the holder frame.

In order to effect the longitudinal movement of the slidable frame structure, the bars 18 have mounted at one corresponding pair of ends thereof brackets 23, which have connected thereto pins 24 extending towards each other. A bar 25 secured by screws 41 extends transversely across the middle pair of longitudinal bars 10, and has at the ends thereof brackets 26 preferably unitary therewith. Each of the brackets 26 has pivotally connected thereto at 27 one of the arms of a handle bail comprising two arms or levers 28 interconnected by a handle rod 29. These levers 28 are provided with segmental slots 30 into which extend the pins 24, and said slots are eccentrically curved with respect to the pivot point 27, so that the movement of said levers in clockwise direction, from the position shown in Fig. 2, serves to move the pins 24 to the left. This movement in turn serves to correspondingly move the whole slidable gripper structure, so that the gripping plates 20 move toward the corresponding edges of the sticks, which they press toward longitudinal pins 17 that serve as stops or rests for the sticks. By virtue of the substantial length of guide rest 17 the sticks are held in vertical relation, and the relatively sharp edges of the gripper blades 20 accommodate any non-conformity in the width of the sticks by pressing thereacross to greater or lesser extent in effecting the stick gripping engagement.

In order to pregauge the depth to which the sticks enter the mold cavities there is provided a depth gauging frame of the same plan dimensions as the multiple cavity mold. The depth gauge has a bottom wall 42 constituting a gauge surface, two upwardly extending end walls 43, and angular offset flanges 44 and 45, flanges 45 being rolled or otherwise constructed to receive two longitudinally extending tie rods 46. In mounting the sticks in spaced positions, the stick handling apparatus is seated by resting its feet 14 upon the offset members 44, as shown in Fig. 2 so that the main frame structure is disposed in substantially spaced parallel relationship with the surface 42. The sticks 15 are then inserted into the tubes 16 either from an automatic stick feeder or by hand. The sticks will all bottom upon plate 42 of the gauge frame which thus determines the length which will enter the mold.

To lock the sticks in the fixed position shown in Fig. 3 the handle rod 29 is shifted in clockwise direction from the position shown in Fig. 2, thereby moving the slidable frame member until the plates 20 enter the respective notches 22 and press the edges of the sticks 15. The cam slot 30 as best shown in Fig. 3 thus locks the gripping structure in effective position against corresponding pins 17 as above set forth.

The stick handling device can now be raised by means of handles 13 and transported with its sticks thus gripped into cooperative relationship with the multiple mold assembly 47, Fig. 3, for which the handling device is adapted. The mold has cavities 48 rigidly mounted in and depending from a base plate 49 and disposed in spaced relationship corresponding with the spaced relationship of the sticks in the stick retainer. The mold plate 49 has an upstanding flange 50 engaged by the feet 14 as shown in Fig. 3, thereby accurately positioning the stick retainer to center the sticks in the respective molds. The protrusion of each stick having been pregauged, the sticks are thus immersed uniformly in the body of the syrup, preferably substantially touching the bottoms of the mold cavities.

After the confections have been frozen to their respective sticks, the mold is defrosted, preferably by dipping it for an instant into hot water to loosen the bond between the mold wall and the confections, whereupon the stick retainer frame is grasped by its handles 13 and lifted from off the mold, in which operation the sticks and confections bonded thereto are removed as a unit from the mold. Each stick in this operation is lifted vertically, and the breakage resulting from carelessness in withdrawing individual sticks by hand is obviated.

The stick retaining frame may be placed over an appropriate hopper or bag or basket (not shown) and a simple leftward movement of the handle rod 29 causes the gripping edges to pass out of the stick guide funnels and to disengage the sticks, which thereupon with their confection heads bonded thereto drop by gravity into the hopper bag or basket. If desired, the confections may be automatically wrapped in the course of their gravity drop as disclosed and claimed for instance, in my copending application Serial No. 453,896 filed May 20th, 1930.

The embodiment of Figs. 6 and 7 differs from that of the other embodiment merely in the transmission between the handle member and the stick gripper structure. The side arms 52 of the handle bail in this embodiment are pivoted at 53 in blocks 54, under instead of over the stick holder frame. Arms 52 are in the form of bell crank levers, the shorter arms 55 of which are pivotally connected as at 56 to links 57 under the plate, the opposite ends of which links are pivotally connected at 58 to lugs 59 affixed at 59' under the movable bars 18 of the gripper structure.

The latter embodiment is desirable inasmuch as the movement of the gripper structure is effected by a toggle action between bell crank arm 55 and link 57, in which even less friction is exerted than in the cam-operated embodiment of Figs. 1 to 5. The toggle when set affords an effective stick gripping lock, which however, is readily released when handle 52 is moved back to the right.

While the invention has its preferred application to the manufacture of frozen confections embodying handle sticks as above set forth, features of the invention as defined in the broader claims are of more general application to the manufacture of various types of articles including ice cream bonded to a stick, candy or other food products bonded to a stick, and to the production of a wide range of other articles of manufacture in which a liquid is converted to a solid within a mold and a protruding member such as a stick or handle is to be bonded in predetermined position into the hardening mass during the hardening thereof.

The term "stick" as used in certain of the claims is not to be limited necessarily to a splint of wood, but embraces equivalent structures upon which the body of the article is bonded and which may serve as a handle.

It will thus be seen that there is herein described apparatus in which the several features of this invention are embodied, and which apparatus in its action attains the various objects of the invention and is well suited to meet the requirements of practical use.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent is:—

1. A stick handling device including a frame structure, a unitary guide tube mounted upon said frame structure and adapted to receive a stick therethrough, said guide tube having an opening therein at one side only, a gripping member mounted to slide upon the frame structure and means for advancing the gripping member through the opening in the guide tube and into clamping engagement with a stick in said tube.

2. A stick handling device including a skeleton frame structure, a row of stick receiving guide tubes fixed upon said frame structure, said guide tubes having aligned openings therein, a gripper bar disposed in parallelism with the row of guide tubes and mounted for sliding movement along said skeleton frame structure and into the openings of the guide tubes to simultaneously lock all of the sticks therein.

3. A stick handling device including a skeleton frame comprising a plurality of spaced flat rigidly connected longitudinally extending bars, means fixed with respect to said frame for receiving a plurality of individual sticks in spaced relationship, a second skeleton frame mounted for limiting sliding movement on the first frame and including a pair of spaced connected longitudinally extending bars parallel with the bars of the first frame, a plurality of transversely extending gripping members fixed on said sliding frame and means for moving said slide frame and thereby shifting the gripping members which it carries into clamping engagement with sticks in the stick receiving means.

4. A stick handling device including a skeleton frame structure, slotted guide tubes mounted on said frame structure for receiving a plurality of sticks in alined relationship, said sticks extending beyond the top of said frame structure, a gripping plate resting on said frame structure, and means for moving said plate in a direction transverse to the direction of its length to cause it to enter said slots and engage the sticks just above the top of the frame structure.

5. In combination, a skeleton frame bar structure, means for supporting said frame structure in substantially parallel spaced relation from a gauge surface, a row of guide tubes in alined spaced relationship on the frame bars for receiving sticks, each of said guide tubes being provided with an opening, said openings being in alined relationship, and each of said guide tubes having a flared upper portion to facilitate the reception of the sticks, a gripping plate extending across the row of alined guide tubes and mounted for sliding movement along said frame bars, and means for moving said plate through the openings in said guide tubes to collectively lock all of the sticks therein in position.

6. Stick handling apparatus comprising a stick holder frame having tubular stick guide conformations upstanding with respect thereto, a complementary stick gripper frame movable along said holder frame and presenting stick gripping edges, said guide tubes being slitted adjacent the plane of said holder frame to afford entry for the respective stick gripping edges.

7. Stick handling apparatus comprising a stick holder having upstanding flattened guide tubes for flat sticks, complementary stick gripping means correlated with said holder to be movable therealong, said tubes being slotted adjacent said holder at one of the narrow edges thereof for entry of the stick gripping means to press the sticks against the opposite wall of the flattened holders.

8. Stick handling apparatus comprising a holder frame and a gripper structure correlated therewith, a bell crank handle member pivoted to said holder frame and extending thereunder and a link connecting the end of said bell crank lever to said gripper frame, said gripper frame having a track guiding movement with respect to the handle frame.

9. Apparatus as set forth in claim 3, and wherein certain bars of the skeleton frame include bent under ends affording feet to support the frame.

MILTON SCHNAIER.